United States Patent [19]
Edelson

[11] Patent Number: 5,454,853
[45] Date of Patent: Oct. 3, 1995

[54] METHOD FOR THE PRODUCTION OF STEEL

[75] Inventor: Jonathan Edelson, Princeton, N.J.

[73] Assignee: Borealis Technical Incorporated Limited, Eli, Israel

[21] Appl. No.: 258,503

[22] Filed: Jun. 10, 1994

[51] Int. Cl.$^6$ ........................................ C22B 4/00
[52] U.S. Cl. .............................. 75/10.43; 75/10.34
[58] Field of Search ........................ 75/10.43, 10.34

[56] References Cited

U.S. PATENT DOCUMENTS 2,805,930  9/1957  Udy ............................. 75/10.34

OTHER PUBLICATIONS

Gretz; Korf; and Lyons; Hydrogen in the Steel Industry; 1991, Jun. pp. 691–693.

*Primary Examiner*—Peter D. Rosenberg

[57] ABSTRACT

In a method for the production of steel in an environmentally benign fashion, energy sources other than conventional fossil fuels are used to produce reductant fuels. These reductant fuels are used for the reduction of iron ore and its conversion to steel. Furthermore, these reductant fuels may be stored in order to smooth fluctuations in the primary energy supply. Electrical energy may be stored to smooth out short term fluctuations in the primary energy source. Energy for the reduction and conversion process may be supplied in part directly from the primary energy source, avoiding inefficiencies in the production and storage of the reductant fuel. Possible primary energy sources include solar power, wind power, off-peak power supplied as part of load leveling plants, as well as conventional constant power output from an ordinary power plant.

7 Claims, 1 Drawing Sheet

5,454,853

METHOD FOR THE PRODUCTION OF STEEL

BACKGROUND-CROSS-REFERENCE TO RELATED APPLICATIONS

This invention may make use of the reduction process disclosed in my patent application soon to be filed under the title "Method for Reducing Particulate Iron Ore to Molten Iron with Hydrogen as Reductant."

BACKGROUND-FIELD OF INVENTION

The present method relates to the field of energy use in metallurgical processing.

BACKGROUND OF THE INVENTION

Conventional steel production methods make extensive use of fossil fuels. Use of these fuels leads to many undesired side products such as carbon dioxide, carbon monoxide, sulfur dioxide, nitrogen oxides, and others. Many of these side products are released into the atmosphere, for example, through smoke stacks. The use of fossil fuels has a detrimental impact on the environment: acid rain, airborne carcinogens, global warming, and smog are all partially attributed to fossil fuel use. To account for the externalities of fossil fuels, various carbon taxes have been proposed. If such taxes become law, then there will be a strong profit motive to move away from fossil fuels.

The most energy intensive step in steel making is the initial reduction of the iron ore to the metallic state. Most commonly, this step is accomplished by using a blast furnace. These furnaces use vast quantities of coal (i.e. fed as coke) both to heat the reduction reaction and to supply the reductant gas. Replacement processes for the blast furnace have used natural gas for the reduction process. These replacement processes have led to greater energy efficiency and lower carbon emissions. However, the products of direct-reduction processes are not generally usable in steel-conversion processes which expect blast furnace metal. Additionally, carbon emissions can not be eliminated simply through the use of alternative fossil fuels.

Carbon can be used as a renewable resource, in which some of the fuel based emissions will be recovered naturally. For example, some of the oldest iron processing methods involve the use of charcoal. These processes produce large quantities of carbon dioxide. However, the charcoal comes from the partial combustion of trees, and the carbon in the trees comes from the air. Thus, the net carbon dioxide emission is zero. This process is problematic given the product impurities which would be introduced by the charcoal. Although carbon dioxide emissions would be net zero, there would be excessive emissions of other pollutants, especially particulate pollutants. While the general principal of using renewable resources to prevent pollution remains valid, the use of plant based charcoal is unlikely to be viable.

The use of natural gas and charcoal, while potential improvements over the use of coal, only address part of the problem of pollution in steel production. Specifically, they only address energy usage in the reduction step, not in the other processes associated with the production of steel. Furthermore, the use of natural gas would only decrease the emissions of carbon dioxide and other pollutants. A useful improvement would use alternatives to conventional energy sources in order to supply all of the energy necessary for steel making in a non-polluting fashion. In a paper by J. Gretz et al., published in the International Journal of Hydrogen Energy, volume 16, number 10, pages 691–693 (1991) hydrogen produced via electrolysis from hydroelectric power was proposed as a steel plant fuel. Although this paper presents a viable alternative to fossil fuels, it does not present any method for the actual use of hydrogen in this fashion.

OBJECTS AND ADVANTAGES

Accordingly, besides the objects and advantages of the methods of producing steel described in my above patent, several objects and advantages of the present invention are the following:

It is the primary object of the present invention to provide a steel making process which makes extensive or total use of renewable energy resources.

An advantage of the present invention is improved environmental compatibility of the steel making process through reduced carbon emissions and other pollutant emissions.

An advantage of the present invention is improved product quality through the elimination of impurities introduced with fossil fuels.

An advantage of the present invention is reduced costs in the event that carbon taxes are implemented.

It is also an object of the present invention to provide a steel making process which makes use of produced reductant fuels.

An advantage of the present invention is that the reductant can be made chemically pure, with resultant improvements in product quality.

An advantage of the present invention is that reductant of suitable quality is readily produced, as is the case with fossil fuels where suitable reductant material must be located.

Further objects and advantages of this invention will become apparent from a consideration of the figure and ensuing descriptions.

LIST OF REFERENCE NUMERALS

Figure 1:
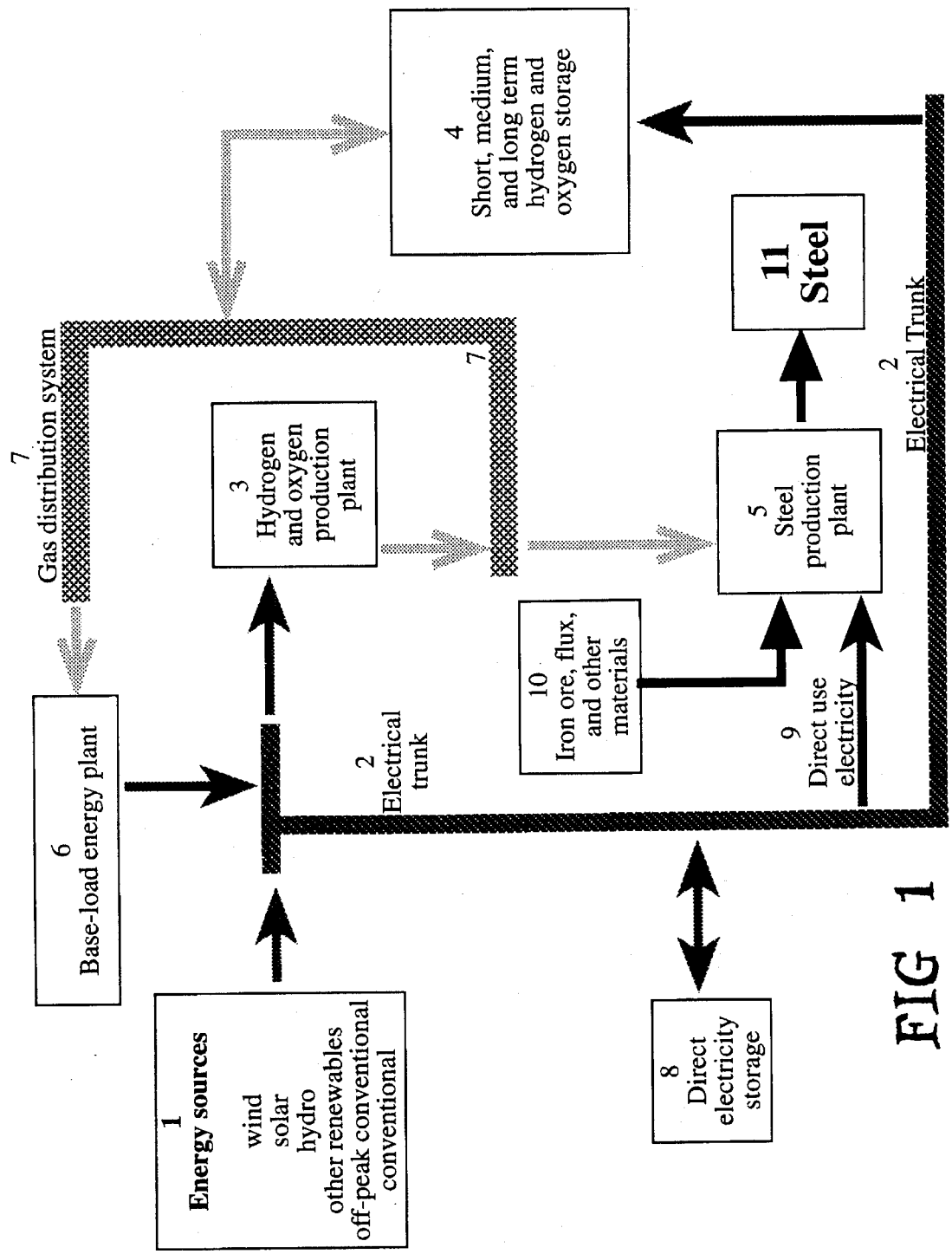
FIG. 1 is a flowchart showing the energy and materials flows in a simplified embodiment of the present invention.

1 energy sources: wind, solar, hydro, other renewables, off-peak conventional, conventional

2 electrical trunk

3 hydrogen and oxygen production plant

4 short, medium, and long term gas storage

5 steel production plant

6 base-load energy plant

7 gas distribution system

8 direct energy storage

9 direct use electricity

10 iron ore, flux, and other materials

11 steel

DESCRIPTION OF THE INVENTION

The current invention is a reduction to practice of the concept presented by J. Gretz et al., in a paper published in the International Journal of Hydrogen Energy, volume 16, number 10, pages 691–693 (1991).

Electrical power from a number of sources is used as the primary energy supply. These sources can include any one or more of the following: wind power, solar power, hydropower, as well as off-peak power in a demand side management system or even conventional power from a dedicated power plant, as well as other sources of electrical power. This electricity is used to produce a reductant fuel which is then used in the iron and steel making process. As the steel making process requires a certain amount of direct heat, some fraction of the electricity may be diverted directly to the steel making process for use in electric heating. Along with the reductant fuel, oxygen is produced, some of which is stored for use in various heating and steel conversion tasks. Most of the oxygen remains as a valuable byproduct.

Storage for the reductant fuel and oxygen is provided in order to smooth out variable electrical power supplies. For example, if solar power were used as the primary energy supply, then the reductant fuel would be produced only when the solar cells are providing power. Part of this fuel would be used immediately, but most of it would be stored to allow for continuous operation. When the electrical power is available, some of it may be used directly, bypassing the fuel production step for part of the energy use. Additionally, a small amount of electrical power may be stored to smooth out short term power fluctuations.

The fuel storage may be of several types, a mix of which is selected based on site parameters. Basically, storage may be expensive in terms of use, or expensive in terms of capital outlay. A proper mix of these storage systems must be made in order to minimize costs. For example, low pressure gas storage is the cheapest to use in terms of the energy cost of storing the fuel. However, low pressure gas storage requires large variable volume containers, which are expensive. Pressurized storage systems require smaller tanks, which can be less expensive for a given amount of mass storage. However, compression of gas for a pressurized storage system is costly in terms of energy use. The densest storage is attained with liquefied storage. Per unit mass stored the storage tanks are inexpensive, however the liquefaction equipment is expensive and the liquefaction process very energy intensive. Selection of the proper storage mix may be made from consideration of the variability in energy supply and the need to remain continuously operational.

The reductant fuel, either from storage or directly from the reductant plant, is used to supply energy for the iron and steel processes. The reductant fuel is supplied to the reduction furnace both as a reagent and as a heat source. The reductant fuel is combusted with the oxygen to provide heat for the steel conversion steps. Finally, the reductant fuel may combusted with the oxygen in a power plant in order to produce electricity. The use of a power plant is needed to supply the minimal electricity needs of such items as motors, lighting equipment, etc. when electricity from the primary energy source is unavailable.

As noted above, when available, the electricity from the primary sources is used directly, bypassing the conversion of electricity to fuel and back again to electricity.

The used reductant may be cleaned of impurities and recycled. In the case of hydrogen as the reductant fuel, the reduction product is water mixed with unused hydrogen. The water may be condensed out of the top gas stream. Other impurities are scrubbed out, and the hydrogen reused. The water can be reused in the electrolysis plant to make more hydrogen.

In the preferred embodiment, the reductant fuel is hydrogen. However, other reductant fuels are possible, as are systems which use several different reductant fuels in different roles. For example, sodium could be used as a reductant, with hydrogen being used as the heating fuel. Hydrogen is advantageous because large scale electrolytic plants are already well known in industry. Large scale storage of hydrogen is used widely in industry, and the use of hydrogen is well known in the metals industry.

With reference to FIG. 1: Electricity from one or more of energy sources 1 is fed to an electrical trunk 2. Electrical trunk 2 may or may not be grid connected. If electrical trunk 2 is not grid connected, then it need not be grid synchronized, and need not be frequency stable. Electrical power is distributed to a hydrogen and oxygen production plant 3, short, medium, and long term gas storage 4, and a steel production plant 5. Additional power may be supplied to the electrical power distribution system by a base-load energy plant 6, which supplies the minimal electrical power needs of the system when energy sources 1 are unavailable.

Hydrogen and oxygen production plant 3 uses electricity to produce hydrogen and by product oxygen via the well known electrolytic process, or any other process available. The product gasses are fed to a gas distribution system 7. Plumbing details of gas distribution system 7 are well understood in the art, and therefore not described. Gas distribution system 7 supplies hydrogen and oxygen to steel production plant 5 for direct use, to short, medium, and long term gag storage 4 for later use, and to base-load energy plant 6 to supply electrical power when energy sources 1 are unavailable.

Short, medium, and long term gas storage 4 consists of several storage media, the precise mix being determined by the economics of the individual media and the variability in the primary energy supply. Gas storage methods are well known in the prior art, and therefore are not described.

Steel production plant 5 consists of a reduction furnace, steel conversion process, casting equipment, and forming equipment. The reduction furnace may be of the type described in a patent application to be filed by this inventor, or it may be a direct-reduction furnace, such as is used in the steel industry, modified to operate with hydrogen. It may even be a blast furnace converted for hydrogen operation, as described in a patent application to be filed by this inventor. However, such blast furnace operations would entail carbon dioxide emissions, as blast furnace operation requires coke. In the latter case, the carbon dioxide emissions are non-optimal. However, such carbon dioxide emissions would be reduced to roughly 10% of the values found in conventional blast furnace operations.

Reduced product from the reduction process is supplied to the steel conversion process. Depending on the reduction step, the steel conversion process may be a melting and purification step, a de-carburizing step, or a ladle-refining step. If the reduction step uses the process disclosed in my co-pending patent entitled "Method for Reducing Particulate Iron Ore to Molten Iron with Hydrogen as Reductant," then the steel conversion process is the simple ladle-refining step. In all cases, heat for the steel conversion process may be supplied through the combustion of hydrogen and oxygen. When electricity is available, heat may be supplied through electrical heating processes. Additional oxygen may be supplied for the use of de-carburization processes.

The final steel product is cast into slabs for later shaping. The casting process does not generally require an external heat input, however, it may require electricity. This electricity is provided either by energy source 1, or by base-load energy plant 6, as necessary.

SUMMARY, RAMIFICATIONS, AND SCOPE

This invention is a method for the production of steel. While the above description contains many specificities, these should not be construed as limitations on the scope of the invention, but rather as an exemplification of one preferred embodiment thereof. Many other variations are possible. For example, the electrical energy storage system could be made much larger, to the point where it would supplant storage of the reductant fuel. Possible methods for storing such large quantities of electricity include superconducting magnetic energy storage systems, or compressed gas energy storage. Other variations would include the processing of other ferrous metals. Accordingly the scope of the invention should be determined not by the embodiment illustrated, but by the appended claims and their legal equivalents.

I claim:

1. A method for the production of a reduced metallic product from metal ores or ore equivalents comprised of the following steps:

a) producing a reductant fuel in suitable electrochemical means wherein electrical power from suitable electrical source means, including but not limited to one or more of the following: renewable electrical resources, off peak mains electricity, conventional power plants, is used to disassociate suitable source material into said reductant fuel and oxidant byproducts, and b) storing said reductant fuel in suitable storage means of sufficient capacity to provide said reductant fuel during any expected period of insufficient production of said reductant fuel, whereby use of said reductant fuel is isolated from production of said reductant fuel, and c) reducing a material consisting of metal ore or ore equivalents including but not limited to iron ore, mill scale, nickel ore, or other ferrous metals chemically combined with oxidative elements, in suitable reduction means using said reductant fuel for chemical reduction potential and combusting said reductant fuel to provide heat for the reduction reaction, whereby the electrochemically produced reductant fuel may be used to produce metals using electrical power of irregular availability as the sole source of energy and reduction potential, and whereby said electrochemically produced reductant fuel may be of substantially greater purity than conventional reductants, thus enhancing the quality of said metallic product.

2. A method as in claim 1 wherein said reductant fuel is hydrogen.

3. A method as in claim 2 wherein said hydrogen is produced by the electrolysis of water.

4. A method as in claim 3 wherein said water is recovered from the exhaust gas stream of said iron reduction process.

5. A method as in claim 2 wherein said iron reduction means is a hydrogen smelting reduction furnace.

6. A method as in claim 1 wherein electrical heating by suitable electrical heating means supplements said use of reductant fuel for heating of said reduction process, replacing entirely or in part said use of reductant fuel for heating as electrical power becomes available, whereby electrical power may be directly used when said electrical power is available, thus increasing the efficiency of the use of said electrical power.

7. A method as in claim 1 wherein said reductant fuel is further used to supply heat for conversion of said metallic iron to steel.

* * * * *